E. GUILLOT.
APPARATUS FOR CLEANING SINKS, &c.
APPLICATION FILED MAR. 27, 1917.
1,228,320.
Patented May 29, 1917.
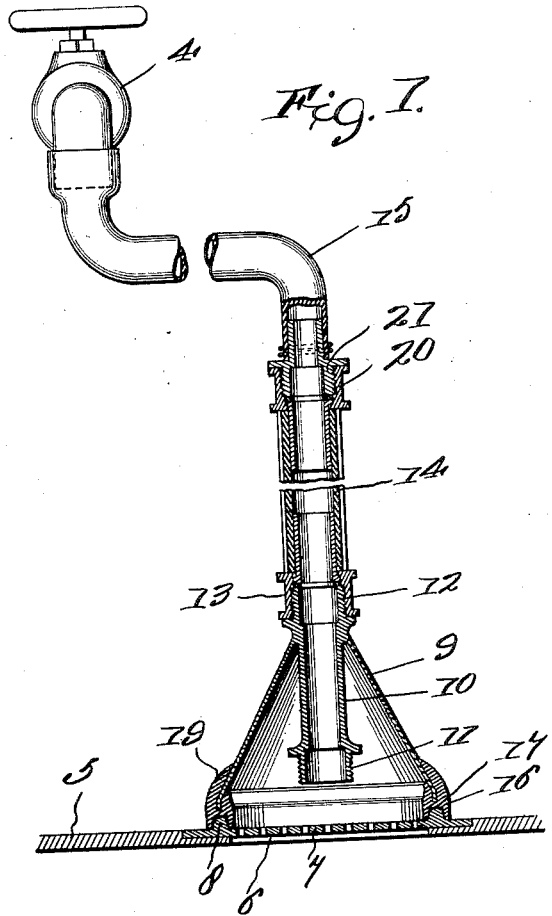
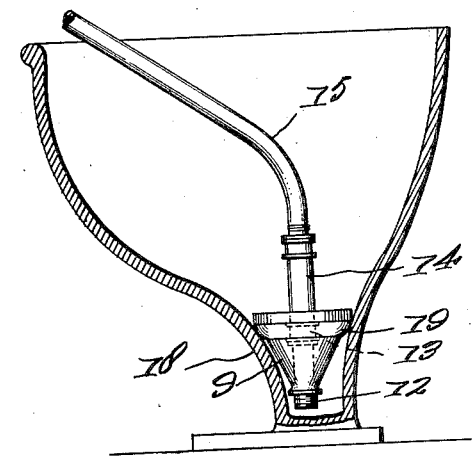
Inventor
Eugene Guillot,
by Wilkinson, Ginsta & Mackaye
Attorneys
Witnesses
Edwin J. Beller
R. J. McWhinney

UNITED STATES PATENT OFFICE.

EUGENE GUILLOT, OF HELENA, MONTANA.

APPARATUS FOR CLEANING SINKS, &c.

1,228,320.  Specification of Letters Patent.  Patented May 29, 1917.

Application filed March 27, 1917. Serial No. 157,774.

*To all whom it may concern:*

Be it known that I, EUGENE GUILLOT, a citizen of the United States, residing at Helena, in the county of Lewis and Clark and State of Montana, have invented certain new and useful Improvements in Apparatus for Cleaning Sinks, &c., and do hereby declare the following to be a full, clear, and exact description of the invention, such as will enable others skilled in the art to which it appertains to make and use the same.

The present invention relates to apparatus for cleaning sinks, etc., and more particularly resides in an improved apparatus for applying fluid pressure to dislodge accumulations in the waste pipes of sinks, bath tubs, toilets, and sewers.

Broadly stated, the invention consists in a hood for forming a fluid-tight joint about the pipe to be cleaned, such hood being in connection with a supply of water or other fluid, which, on being admitted to the hood, builds up a pressure therein and carries away the accumulated material which is the cause of stopping up the pipe.

In the accompanying drawings forming a part of this application, and in which similar reference symbols indicate corresponding parts in the several views:

Figure 1 is a vertical section, with parts in elevation, of a sink with my improved apparatus shown applied thereto.

Fig. 2 is a similar view with the hood reversed and shown for use in connection with a toilet bowl; and, Fig. 3 is a bottom plan view of the hood.

Referring more particularly to the drawings, and for the present to Fig. 1, 4 designates a faucet above a sink 5, which has the usual outlet or drain 6, covered by the perforated plate 7 provided with the customary head 8.

My improved apparatus includes a hood 9, preferably of metal and rubber construction, it being with advantage made of metal fiber board, although rubber alone will also be found adaptable for the hood 9; said hood 9 being of the conical shape shown and having a pipe 10 entering through its apex, which pipe 10 is provided with nozzles 11 and 12, one of which lies within and one without the hood 9. These nozzles 11 and 12 are threaded to receive a coupling nut 13 on one end of a hose 14, which carries on its other end a similar coupling nut 20. For general purposes the hose 14 will be about eighteen inches in length, but may be longer or shorter as the special needs of any particular case may require. The nut 20, carried on the hose 14 is screwed directly to a faucet, where the faucet is provided with threads; but where, as in Fig. 1, the faucet 4 is smooth an additional hose 15 is fitted thereover, which additional hose 15 carries a threaded nipple 21 whereby the coupling nut 20 may be screwed on same, thus uniting the two hose.

In Fig. 1, the coupling nut 13 is illustrated as uniting the hose 14 to the outer nozzle 12; and in this same figure the base or wide, open end of the hood 9 is shown as fitting over the drain 6 and plate 7. There is a rubber gasket 16 surrounding the edge of the base of said hood 9 and having therein an annular groove 17 for receiving the bead 8 with the object and effect of forming a fluid-tight joint to prevent the escape of water or other fluid employed. This annular groove is shown to advantage in Fig. 3.

When the drain 6 becomes stopped up, the device is placed in the position indicated in Fig. 1, and the faucet 4 then turned on. Water will then flow through the hose 14 and through pipe 10 into the hood 9, which will be held forcibly down with the gasket 16 tightly against the draining plate 7 and its bead 8. The accumulations in the stopped up drain 6 will be subjected to the weight of the water above same and also to the pressure that will rapidly build up in said hood 9, and these forces will be found ordinarily sufficient to clear out the stoppage. If greater pressure be desired a pump might be included in the connections at nozzle 12 or 11, or coupling 20 might be placed in connection with a source of steam supply.

Turning now to Fig. 2, it will be seen that the device is equally adapted for use with pipes having wide mouths and being uncovered by draining plates. Here, the hood 9 is shown inverted with the apex pointing downward and inserted into the bottom of a closet bowl 18, the hose 14, in this instance, being connected by the coupling nut 13 to the inner nozzle 11. A lateral lip 19 on the gasket 16, which extends over the side of the hood 9, is fitted snugly against the adjacent walls of the bowl bottom and furnishes the fluid-tight joint. Water or other fluid is employed in this as in the former case, and is discharged through the outer nozzle 12. During the operation the overflow vent in sink or bath tubs is closed with a rubber attachment making fluid tight joint.

The hose may be readily connected to and disconnected from either of the nozzles 11 and 12 and the hood 9 is quickly turned to either the upright or inverted positions, so that my device is conveniently and rapidly adapted to its different uses and forms an efficient means for clearing out stopped up sinks, bath tubs, toilets, sewers, and the like.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:

1. A device of the character described including a reversible hood, with a gasket on one edge of said hood and extending over one side thereof for forming a fluid tight joint when the hood is in either position, substantially as described.

2. A device of the character described including a substantially conical hood having a gasket, with an annular depression therein, secured to the enlarged end of said hood, and a pipe passing through the apex of said hood and having nozzles at both ends, one on the interior and the other on the exterior of said hood for receiving fluid supply connections, substantially as described.

In testimony whereof, I affix my signature.

EUGENE GUILLOT.